Nov. 11, 1924.

W. G. BAMBRIDGE

BALL BEARING

Filed Feb. 20, 1923.

INVENTOR:
William G. Bambridge
BY Wm Wallace White
ATT'Y.

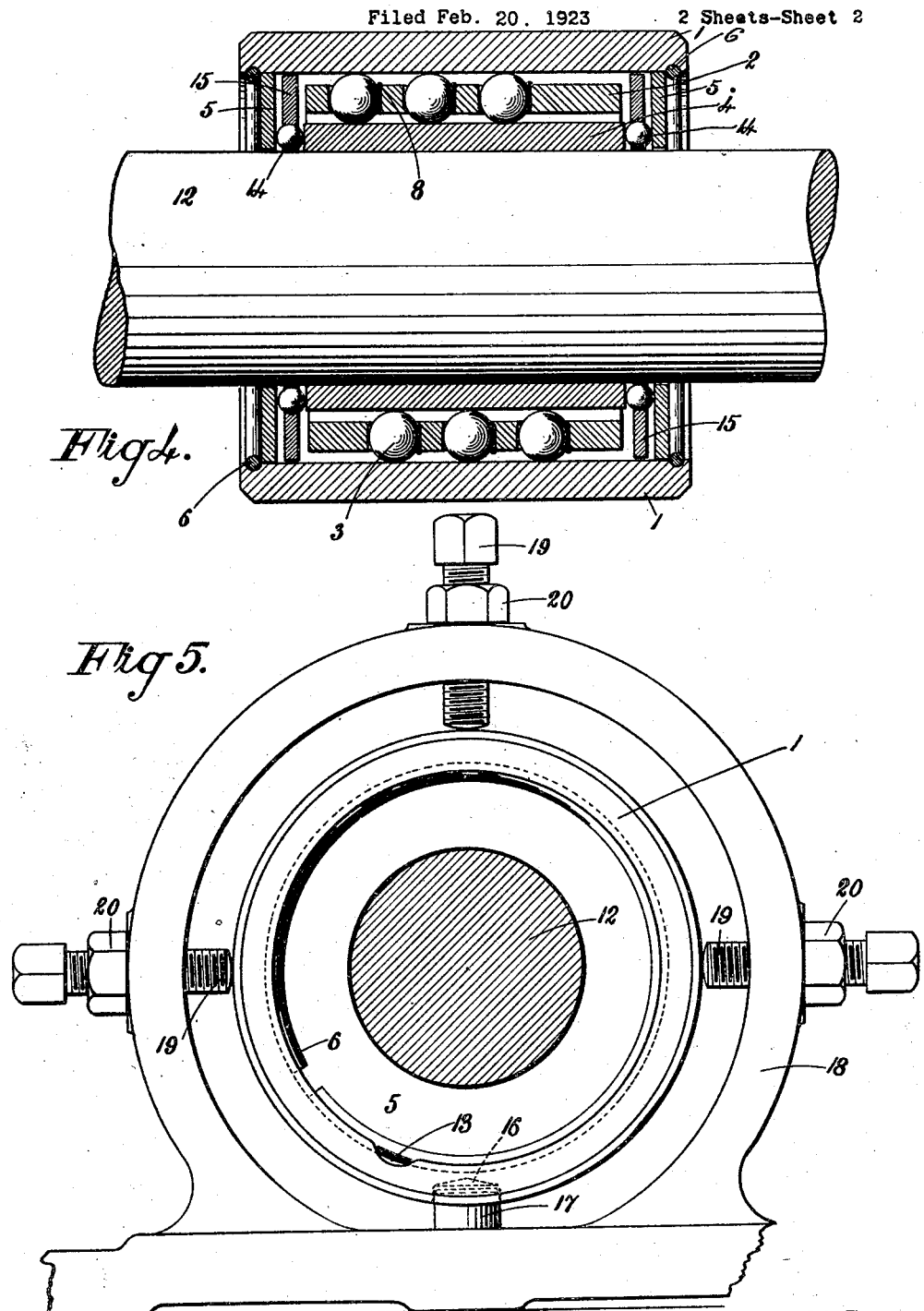

Patented Nov. 11, 1924.

1,514,597

UNITED STATES PATENT OFFICE.

WILLIAM GINNS BAMBRIDGE, OF KETTERING, ENGLAND.

BALL BEARING.

Application filed February 20, 1923. Serial No. 620,147.

*To all whom it may concern:*

Be it known that I, WILLIAM GINNS BAMBRIDGE, a subject of the King of Great Britain, residing at Kettering, in the county of Northampton, England, have invented new and useful Improvements in or Relating to Ball Bearings, of which the following is a specification.

This invention relates to ball bearings preferably of the type employed for line shafts or the like, and has for its object an improved construction thereof, as will be hereinafter described.

Hitherto it has been the practice in manufacturing ball bearings to place the balls in a circumferential groove or grooves or in a cage, the balls running parallel to the edges of the bearing. In this case all the balls in one race run in the same track, thus in time wearing grooves on the shaft or spindle.

Now it is the main object of this invention to provide a ball bearing which eliminates this disadvantage, and also combines the advantages of simplicity of construction, cheapness of manufacture, ease of fixing and adjustment and automatic lubrication.

According to the invention the balls are arranged in a cage in a spiral series. The bearing comprises a housing, an inner sleeve, balls running between said housing and sleeve, a cage for retaining the balls in the form of a spiral series, and washers and springs to hold said cage and sleeve in position in the housing.

The cage consists of a cylindrical body having a spiral series of holes or cavities in which the balls are retained by one or more wires arranged spirally around the cage so as to slightly overlap the balls.

In further describing the invention reference will be made to the accompanying drawings showing a convenient example thereof.

In the drawings:—

Figure 4 is a longitudinal sectional view of the bearing.

Figure 5 is an end elevation showing the bearing mounted in a yoke.

Throughout the drawings like parts are designated by the same reference characters.

Figure 1:
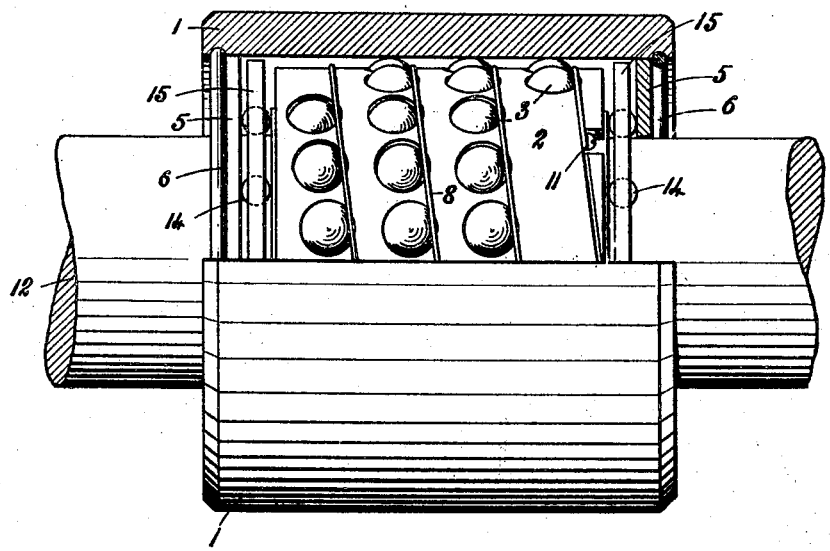
Figure 1 is a side elevation of the improved bearing with part of the housing broken away to show the arrangement of balls in the housing.

The bearing comprises a housing 1 of cylindrical form, a cylindrical cage 2 for retaining the balls 3 in proper relative position, an inner sleeve 4 between which and the housing the balls run, and washers 5 and springs 6 fitted into the ends of the housing to hold said cage and sleeve in position therein.

Figures 2, 3:
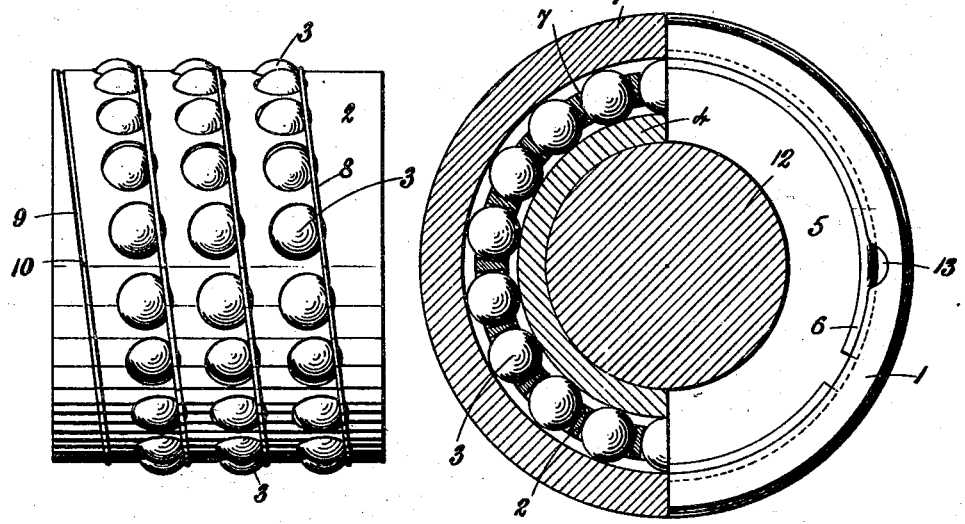
Figure 2 is a half sectional and half end view of the bearing.
Figure 3 shows the cage and balls removed from the housing.

The cage 2 consists of an aluminum or like cylindrical sleeve provided therein with a series of holes 7 arranged spirally or threadwise therein as shown in Figures 1 and 3. The balls 3 are retained in the holes 7 preferably by means of a wire 8 located in a groove 9 formed spirally in the outer face of the housing and in such proximity to the holes 7 that the said wire will slightly overlap the balls. At one end the wire 8 is bent and inserted into a hole in the housing as indicated at 10 (Figure 3) while at its other end it is fastened to the housing by means of a screw as shown at 11 in Figure 1. The balls can be removed from the housing by slightly springing the wire 8 away from the balls or unfastening the same. Instead of the single wire 8 overlapping the balls on one side, I may use two such wires running parallel and overlapping the balls on opposite sides. At their inner ends the holes 7 are reduced in diameter to prevent the balls falling inwards.

The inner sleeve 4 is a good fit on the shaft 12 and revolves with the same. At each end on the inside of its bore the housing 1 is grooved to receive the circular springs 6 for the purpose of keeping in place the washers 5. A small opening 13 (Figures 2 and 5) is formed at each end of the housing entering into the circumferential grooves in order that a nail or suitable instrument may be inserted under the circular springs 6 for springing the same out to enable the washers 5 to be removed when it is desired to dismantle the bearing.

To enable the bearing to take end thrust a circular series of balls 14 carried by a washer or cage 15 is inserted between each washer 5 and the adjacent end of the sleeve 4. In this case the sleeve 4 is shrunk or otherwise fastened upon the shaft 12 and the balls 14 by acting between said sleeve and the washers 5 take the end thrust. In this construction the cage 2 is retained in position endwise by the washers 15 and the bearing is adapted to take both journal load and end thrust. When it is not desired to make provision for taking end thrust, the housing 1 is made shorter and the balls 14 and washers 15 are omitted, in which case the cage 2 is kept in place by the washers 5.

A recess or cavity 16 (Figure 5) may be provided in the outside of the housing situated centrally of its length in order to fit upon a pin or projection 17 in a yoke 18 in which the bearing can be carried. Screws 19 in said yoke are tightened on to the housing of the bearing to hold it in position after the shaft 12 has automatically aligned itself. After being tightened to fasten the bearing, the screws 19 are locked by means of nuts 20 thereon.

It will be understood that by placing the balls 3 spirally or threadwise in the cage 2, each ball forms a track of its own and thus eliminates wear on the sleeve 4 and housing. Also one ball automatically passes the oil or other lubricant on to the next and so on thus ensuring good lubrication.

What I claim then is:—

1. A ball bearing comprising a housing, balls, a cage consisting of a cylindrical body having holes therein to carry the balls in the form of a spiral series said balls being separated from each other, a wire passed spirally around the cage to retain the balls therein, and means to retain the cage in the housing.

2. A ball bearing comprising a housing, an inner sleeve, balls situated between said housing and sleeve, a cage consisting of a cylindrical body having holes therein to carry the balls in the form of a spiral series, a wire passed spirally around the cage to retain the balls in position therein, and means to retain the cage within the housing.

3. A ball bearing comprising a housing, an inner sleeve, balls situated between said housing and sleeve, a cage consisting of a cylindrical body having holes therein to carry the balls in the form of a spiral series, a wire passed spirally around the cage to retain the balls in position therein, a washer in each end of the housing, and a circular wire spring fitted removably into the housing to retain each washer in place.

4. A ball bearing comprising a cylindrical housing, an inner sleeve, balls situated between said housing and sleeve, a cage consisting of a cylindrical body having holes therein to carry the balls in the form of a spiral series, means to retain the balls within the cage, a washer in each end of the cylindrical housing, and a circular wire spring fitting within a groove in the bore of the housing at each end to keep the washers in place.

5. A ball bearing comprising a housing, an inner sleeve, balls situated between said housing and sleeve adapted to take the journal load, a cage wherein the balls are arranged separated from each other in the form of a spiral series, means for retaining the balls in the cage, a washer at each end of the housing, a circular wire spring engaging a groove in the housing to retain said washers in position, and balls situated between the end of the sleeve and adjacent washer adapted to take end thrust.

6. A ball bearing comprising a housing, an inner sleeve, balls situated between said housing and sleeve adapted to take the journal load, a cage wherein the balls are arranged separated from each other in the form of a spiral series, means for retaining the balls in the cage, a washer at each end of the housing, a circular wire spring engaging a groove in the housing to retain said washers in position, additional balls situated between the end of the sleeve and adjacent washer adapted to take end thrust, and a washer to carry the additional balls.

In testimony whereof I have signed my name to this specification.

WILLIAM GINNS BAMBRIDGE.